US008418465B2

(12) United States Patent
Munson, Jr.

(10) Patent No.: US 8,418,465 B2
(45) Date of Patent: Apr. 16, 2013

(54) GEOTHERMAL HEAT TRANSFER AND INTENSIFICATION SYSTEM AND METHOD

(75) Inventor: David Murray Munson, Jr., Dallas, TX (US)

(73) Assignee: FOI Group, LLC, Dallas, TX (US)

( * ) Notice: Subject to any disclaimer, the term of this patent is extended or adjusted under 35 U.S.C. 154(b) by 462 days.

(21) Appl. No.: 12/842,957

(22) Filed: Jul. 23, 2010

(65) Prior Publication Data

US 2011/0017422 A1    Jan. 27, 2011

Related U.S. Application Data

(60) Provisional application No. 61/271,616, filed on Jul. 23, 2009.

(51) Int. Cl.
*F03G 7/00* (2006.01)
*F01K 27/00* (2006.01)

(52) U.S. Cl.
USPC .................................... 60/641.2; 60/641.5

(58) Field of Classification Search ............ 60/227–230, 60/531, 641.2–641.4, 675, 676
See application file for complete search history.

(56) References Cited

U.S. PATENT DOCUMENTS 3,824,793 A * 7/1974 Matthews ................... 60/641.4
3,857,244 A * 12/1974 Faucette ....................... 60/641.2

* cited by examiner

*Primary Examiner* — Thomas Denion
*Assistant Examiner* — Wesley Harris
(74) *Attorney, Agent, or Firm* — D. Scott Hemingway; Hemingway & Hansen, LLP

(57) ABSTRACT

This invention uses an innovative closed-loop steam cycle with a primary geothermal boiler and a recirculating arrangement to deliver a portion of the enthalpy of that produced steam as a higher temperature and pressure steam to the surface. The geothermal boiler operates at as low a pressure as needed to boil water using heat from relatively low-temperature geologic formations typically found in abandoned oil wells. This system can be deployed in such well bores to extract geothermal energy either as a stand-alone enterprise or in conjunction with tertiary oil recovery efforts. The geothermally-boiled steam provides most or all of the energy to power the process. It is the ability of this system to extract useful heat from below atmospheric boiling temperature heat sources that offers its greatest potential.

23 Claims, 5 Drawing Sheets

GEOTHERMAL HEAT TRANSFER AND INTENSIFICATION SYSTEM AND METHOD

RELATED APPLICATION DATA

This application is related to U.S. Provisional Application No. 61/271,616 filed Jul. 23, 2009, and priority is claimed for this earlier filing under 35 U.S.C. §119(e). The above-identified provisional application is incorporated by reference into this utility patent application.

BACKGROUND OF INVENTION

The capture, transfer and use of geothermal energy has intrigued engineers around the world. Geothermal energy is emitted from deep within the earth and from radioactively decaying formations around the world, yet only in a few places is the heat level high enough to allow useful conversion to mechanical energy and/or electricity to occur.

Efforts to recover geothermal energy have included pumping fluids into hot rock formations through one well and up an adjacent well to a thermal recovery unit that transfers the heat energy to a separate power cycle. In very high temperature areas, such as California's geothermal valley where the majority of electricity produced by geothermal is located, water is injected into high-temperature formations and converted into high-pressure steam down-hole, which returns to the surface and is expanded through conventional steam turbines and condensed and exhausted out. Closed-cycle loops of heat transfer fluid are circulating in well bores for both cooling fluid, in the case of geothermal air-conditioning, or heating the fluid for use on the surface in either heating a facility or powering a low working temperature thermal engine to produce electricity.

Using the traditional non-phase change thermal fluids as heat exchange fluids requires a large volume of fluid to be pumped up and down to the formation level. Allowing formation water(s) that have been pumped through an underground formation to flow to the surface also brings along a variety of toxic and caustic chemicals. The nature of underground water has limited the ability to utilize enormous geothermal heat resources.

Geothermal heat resources are uneconomic given the current state of technology. One of the inherent laws of thermodynamics is that the difference in temperature between the heat source and the heat sink limit the efficiency of any thermal device (Carnot). Most of the earth does not have high-temperature geothermal energy available at a reasonable depth. In particular, most oil fields, because of the water-bearing strata and type of rock, do not possess high bottom hole temperatures.

Although water-bearing formations behind existing well pipe walls have high thermal conductivity and should be able to release heat for decades without temperature decay, the current technology cannot convert this heat to electricity profitably. What is needed is a way to capture, transport and release this heat energy at a higher temperature than the formation offers. This process must be environmentally safe and capable of very long life span.

SUMMARY OF THE INVENTION

This invention uses an innovative closed-loop steam cycle with a primary geothermal boiler and a recirculating arrangement to deliver a portion of the enthalpy of that produced steam as a higher temperature and pressure steam to the surface. The geothermal boiler operates at as low a pressure as needed to boil water using heat from relatively low-temperature geologic formations typically found in abandoned oil wells. This system can be deployed in such well bores to extract geothermal energy either as a stand-alone enterprise or in conjunction with tertiary oil recovery efforts. The geothermally-boiled steam provides most or all of the energy to power the process. It is the ability of this system to extract useful heat from below atmospheric boiling temperature heat sources that offers its greatest potential.

DETAILED DESCRIPTION OF THE PREFERRED EMBODIMENT

Figure 1:
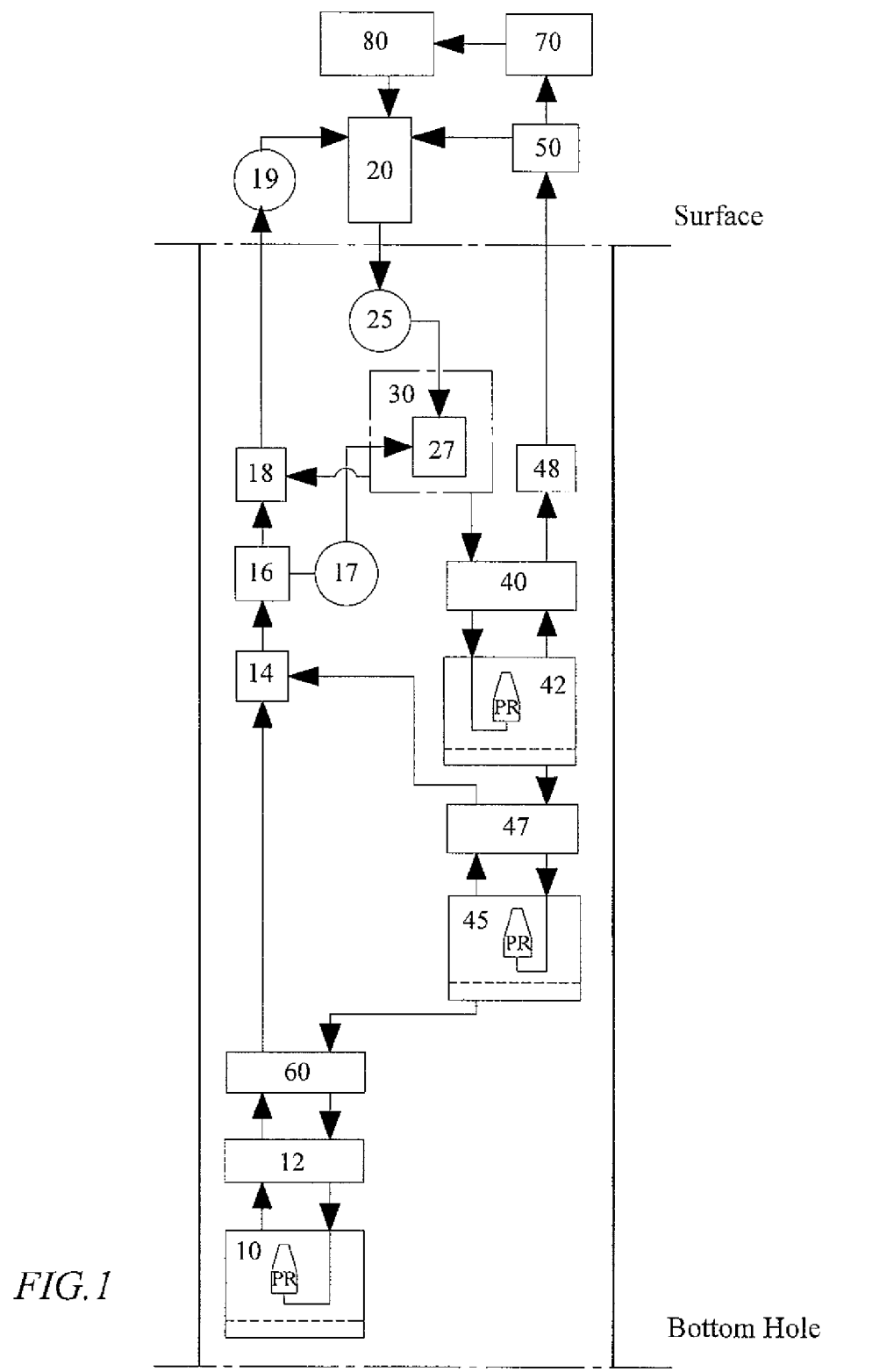
FIGS. 1, 4 and 5 are flow chart diagram of the present invention.

FIG. 1 shows the process steps. As a closed-cycle process, geothermal or other heat input provides the energy to power the process at the lowest level of the process boiler (10). The process delivers heat to the surface at both a low condensing pressure condenser (20) and a small fraction of this geothermal heat to the surface as a significantly-higher condensing pressure steam in condenser (50).

The process begins at the geothermally-heated boiler (10), where water boils at a temperature slightly below the formation temperature. The pressure inside the boiler is regulated at the corresponding saturation pressure to maintain steam production by regulating the flow of feed water into the boiler.

Once the steam is produced, it is immediately superheated and compressed by a heater/compressor (12) located just above the boiler. This combination of superheat and compression is powered by hot process water coming downward. In some installations, supplemental power will be added to increase system efficiency. As the steam travels upward, it is further heated by a counterflow heat exchanger (60) using downward-traveling water from (45) as a heat source.

After the geothermally-produced steam has been compressed slightly and superheated, it continues to travel upward where it can be further accelerated by an optional steam jet compressor (14) powered by superheated steam produced by a water-heated partial flow steam boiler (45) and superheated by another water heat counterflow heat exchanger (47). The rising steam can be further superheated if needed as it travels alongside water being discharged from a higher-pressure water-heated partial boiler (42).

The steam then enters a flow divider (16), where a fraction of the steam enters the downward-flowing gravity pressurized steam condensation-powered intensifier (30). The flow divider can also have a back flow preventer 17 included to assist the startup of the system when the intensifier is not activated by return water yet.

The remainder of steam that was not diverted through the flow divider (16) travels upward to a surface condenser 20 through (jet steam compressor (18) and compression unit (19). There at condenser 20, the heat of condensation can be used while the condensate is sent back down-hole to provide pressurized water to vertical vessel 30 through pressure pump 25. In cases where the pressure buildup of this condensed water (due to gravity) is not adequate, an additional pressure pump (25) can be added. In a typical installation, the water discharged from condenser 20 travels downward over 1,000 meters to arrive vertical vessel at 30. The resulting high pressure water's potential energy is converted from pressure to work on the entering steam using a variety of methods including water jets and/or a water jet-powered impeller (27).

The quantity of steam entering vertical vessel (30) from flow divider (16) is limited by pressure buildup at the entrance to vertical vessel (30). The mixture of steam and water droplets from the exhaust of the water-powered pressurizer (27) located at the top of vertical vessel (30) is compressed as it falls downward. The mixture maintains a saturated equilibrium as it falls.

As the pressure rises in the insulated vertical vessel (30), the quality of the mixture falls as steam condenses to maintain the corresponding rising saturation temperature. Condensation heats the water portion of the mixture to the new saturation condition incrementally as the pressure rises. The process increases both the percentage of water and the enthalpy of the saturated water in the mixture. Since the process is regulated by pressure at any point in the process, different applications will use different methods of extracting the optimal heat delivery. The nature of steam as it approaches its critical point serves to limit the maximum temperature increase of the mixture, as it takes a greater pressure rise to raise the saturation temperature a degree as the pressure gets closer to the critical pressure.

In some installations such as shallower wells or higher temperature geothermal sources, a fraction of the steam in the mixture can be removed near the bottom of the vertical vessel (30). This saturated steam fraction can then travel upward to a steam jet compressor (18) or, alternatively, to a steam jet compressor (48) after passing through heat exchanger (40). This saturated steam combines the separated high-pressure steam with either the upward bound geothermally-produced steam and/or a steam jet compressor (48) acting on the steam generated by the partial water boiler (42) and superheated by the counterflow heat exchanger 40.

Ideally hot saturated water leaves the vertical vessel (30) to achieve maximum temperature. The hot water or the lowest quality steam at the bottom of vertical vessel (30), is slightly cooled by a counterflow heat exchanger (40) that acts to superheat the steam produced by the water-heated partial boiler (42) located just below vertical vessel (30) and heat exchanger (40) in the wellbore.

Much less heat energy is needed to superheat the steam than to boil it. Only a slight superheat is needed to assure that the resulting steam arrives at condenser 50 with very near saturation conditions. In order to produce steam from the hot water, a defined saturation condition must be maintained that is below the water temperature and pressure entering the boiler 42.

The water enters boiler 42 using a pressure-reducing nozzle to create the desired saturation pressure so that specific heat from the un-boiled water can provide heat to boil the desired percentage of entering water. Because the enthalpy of vaporization of water is so high relative to its specific heat, only a small fraction of the water can be boiled, regardless of pressure drop. In applications where a saturated water mixture enters boiler 42, the steam in the mixture expands slightly, while a portion of the saturated water flashes to steam. Both the expanded steam and the water heat produced steam are at the new saturation temperature below the temperature of the entering fluid.

Because it is the saturation pressure maintained in this boiler that determines the surface condenser (50) operating temperature, there is a tradeoff between quality and quantity of water-heated steam production. Hotter water boiling temperature in boiler 42 results in a higher-steam condensation pressure at the surface condenser (50), but this higher temperature means that less specific heat is released from the water. Less steam is produced as a fraction of the water leaving 30.

Less superheat occurs in a higher temperature produced steam from boiler 42 as it is then superheated in heat exchanger 40 before traveling to the higher-temperature steam condenser (50). The heat discharge from condenser 50 is near the saturation temperature of the steam generated by boiler 42, so the boiling temperature of boiler 42 determines the maximum saturation pressure of the steam entering condenser 50. The steam entering condenser 50 will be slightly reduced in pressure due to friction and the losses due to gravity as it rises.

When using a condenser to transfer heat to another use, it is optimal that the steam enter the condenser very nearly at saturation condition for the highest transfer heat temperature. It is this cycling of fluids in the down-hole steam condensation-powered water heater and related attachments that allows a fraction of the geothermally-generated steam's energy to be converted into a much higher-temperature and pressure steam delivered to the surface. The unboiled water exiting from boiler 42 continues downward thru a second heat exchanger 47 that superheats steam produced at a further lower pressure by the water after it goes thru a pressure reducing nozzle in boiler 45. This reduced pressure steam produced by specific heat removed from the water entering 45 travels upward thru heat exchanger 47 and enters steam jet compressor 14 where it adds energy to the geothermally produced steam from boiler 10. The unboiled water in boiler 45 travels downward to heat exchanger 60 and then to provide power to impeller 12 before providing feedwater to boiler 10. Modifications to these steps of course may be needed to adapt the system to design needs. While it may seem at first glance wasteful to use a second water heated boiler to pressurize the rising geothermal steam at jet compressor 14, in fact it makes use of excess specific heat in the water discharge from boiler 45 that is in excess of the heat needed to power heat exchanger 60 and is sized for that purpose alone.

The heat released in condenser 50 is readily and efficiently used by a wide variety of power plants and thermal processes. Even though the quantity of heat is lower than the heat input at boiler 10, the higher temperature at condenser 50 results in a much more efficient use that reduces the quantity of input heat from condenser 50 per unit of produced work.

The lower temperature but much greater quantity of heat from surface condenser 20 can assist these high temperature processes and ideally provide for other low temperature heat loads as well.

Some or all of the heat from condenser 20 may have to be discharged to the environment if there is not enough use for the low temperature heat. The operating conditions of condenser 20 can be adjusted to meet a low temperature heat use at a higher pressure or reduced to the surface heat sink temperature. When the condensation temperature of condenser 20 is desired to be higher than the equivalent pressure of the entering steam, a compression unit (19) can be added to raise the pressure entering condenser 20. This, in turn, raises the condensation temperature to the desired level. When the heat of condensation at condenser 20 has no use, the efficiency of the process of intensification benefits from a lower temperature and pressure in condenser 20.

As the lower temperature heat in the geologic formation has no value in place, even if much of the lower temperature heat from condenser 20 is not used, the valuable heat released by condenser 50 still makes the extraction process profitable and efficient as usable heat is produced on a reliable continuous basis from a previously unusable source.

One significant advantage of this process is that it requires very little mechanical power to be used in the process of extracting, moving and intensifying the heat. Because conversion of heat to energy at heat supply temperatures of around 500K is not very efficient, a kilowatt of mechanical energy requires 4 to 5 kilowatts of heat to produce. Minimizing mechanical power inputs increases the amount of power produced by the available heat significantly.

Compressor 19 can also be used to start the process after a shutdown by creating the desired low pressure in the boiler (10) and higher pressure in the condenser (20). Like so many thermodynamic processes that rely on difference in pressures to operate, this process needs outside power to initiate the low pressure condition needed in the geothermal boiler 10, until the hotter pressurized return water has reached superheater 60 and water pressurizer 12. Obviously as well bottom temperatures well below 100 C will need more assistance than hotter wells. The usefulness and value of the low temperature heat released from condenser 20 will determine the economics of operating compressor 19 as a continuous part of the process. It can be seen that if compressor 19 provides primary compression then the process can move far more low temperature heat than if it were operating solely on geothermal heat. In areas needing low temperature heat suitable for space heating or other similar applications, the primary loop can grow in output as a traditional compression heat pump. In fact the smaller portion of high temperature heat can be used to provide heat to a power generation cycle to power compressor 19 in areas where space heating is the primary energy need. Using the deeper formation heat most efficiently requires different system configurations that all use the basic principle of gravitationally compression of the secondary vertical intensifier 30.

The superheating and compression done on the geothermal steam can only function after the geothermal steam has been produced and raised to the surface condenser (20). The return water provides heat and pressure to power the intermediate stages.

Condenser 20, as with most condensers, will need provisions to remove uncondensable gases from the system as needed.

The process can be changed to match the geothermal heat source at boiler 10, depth and temperature as well as the desired high temperature heat load at condenser 50, and low temperature load at condenser 20. Within intensification vertical vessel 30, mechanical compressing devices can be added for more compression when there is not enough vertical elevation distance to accomplish the pressure rise needed to produce the discharge water temperature needed to power heat exchanger 40 and boiler 42. A booster pump 25 can be added when the vertical height difference between surface condenser 20 and the top of vertical vessel 30 is insufficient to build enough pressure in the supply water to power the water jets and or water jet powered impellers 27 at the top of vessel 30.

The process is limited to operating between the zero pressure boiling temperature and the critical pressure, but it functions best in the middle range of 300K to 500K. The process can deliver higher-grade heat as the boiler (10) temperatures rise. This is limited by the heat source formation temperature, and a higher percentage of produced steam enters the steam condensation power water heater (30).

As it is a closed cycle, an increase in steam is a decrease in water added. With higher-temperature geothermal energy and more steam entering 30, some of the steam can be merely compressed in 30 and discharged near the bottom as saturated steam (at a higher pressure and temperature) into the steam jet compressor (48). This will pressurize the lower-pressure but superheated steam generated at the boiling temperature of the water-heated boiler (42).

The system designer and operator must optimize the flow percentages and rates to ensure maximum efficiency. In some locations, the system may need to be changed over time if the formation temperature and heat flow rate change. In this system, the pressure to fully condense the water steam mixture rises quickly over 500K.

Figure 5:
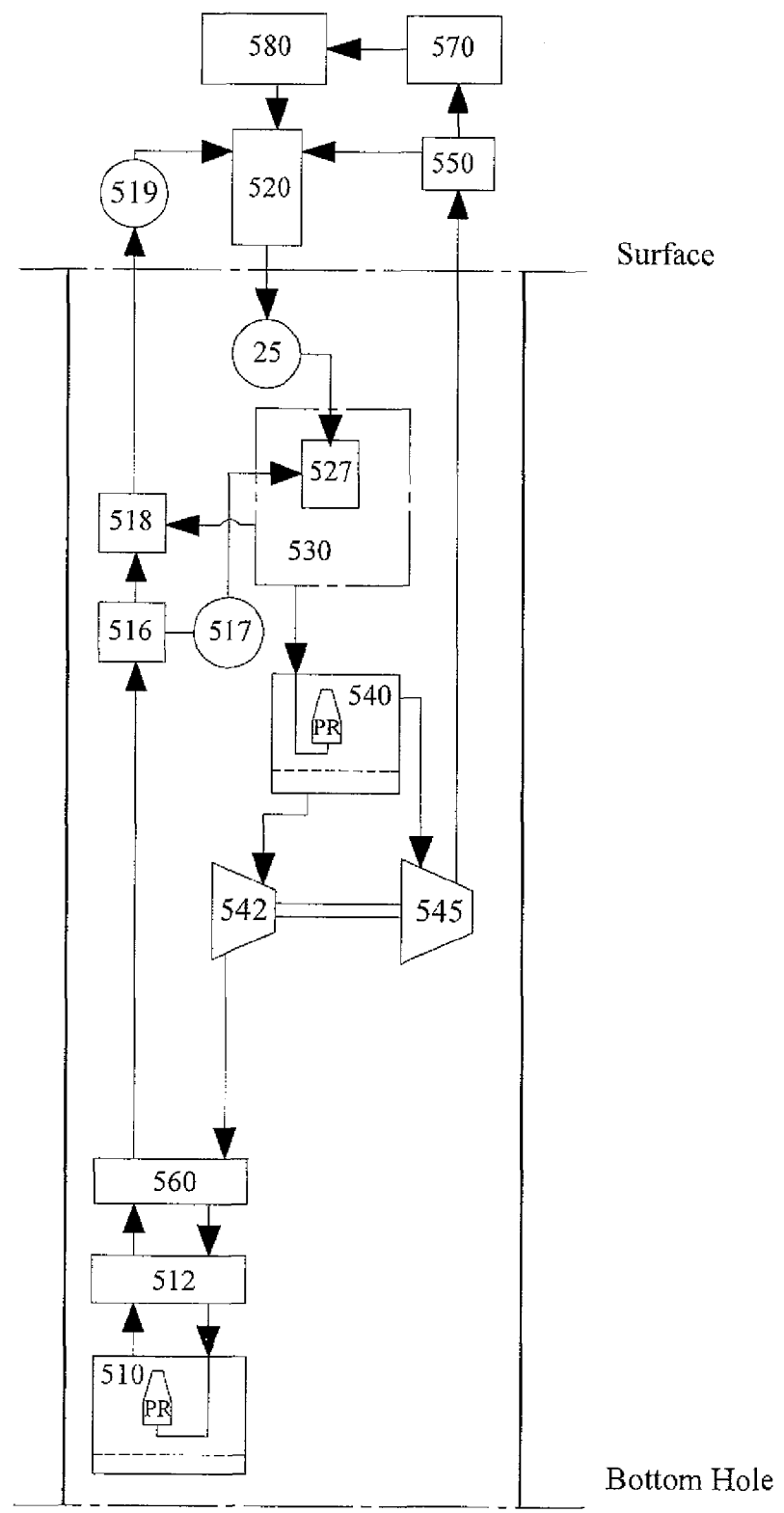

In FIG. 5 a variation is discussed for deep wells with higher bottom-hole temperatures. In this application the down-hole jet condenser may use a steam separator at the bottom instead of the partial boilers to send steam to condenser 50 at a very high temperature. Saturated steam, no matter how hot, will become a mixture of saturated steam and condensed water as it rises and the pressure drops, so using some of the potential energy of the water discharged from intensifier vessel 30 to power a steam compressor located in place of 42 would deliver slightly superheated steam to the surface to maximize heat transfer to condenser 50. So while the system is able to profitably extract heat from currently uneconomic sources, it is effective in high-temperature wells as an efficient heat transfer mechanism.

Figure 2:
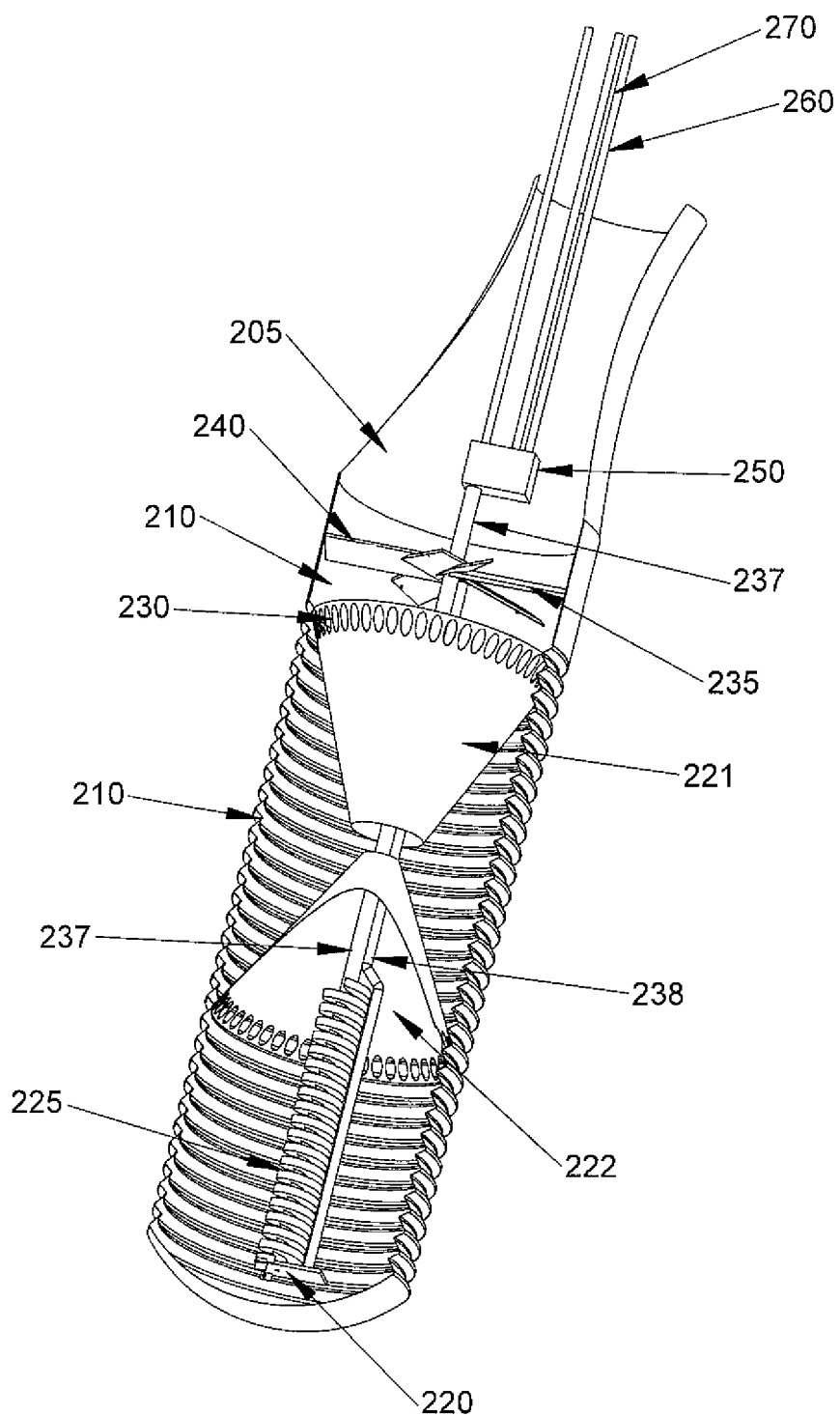
FIGS. 2 and 3 is a cut-away perspective view of a down-hole component used in the present invention.

FIG. 2 shows a bottom hole geothermally heated steam generator. One of the biggest obstacles to extracting geologic heat is the wide variety of elements and compounds that exist at a saturated condition in subsurface water. This system minimizes negative chemical reactions because it does not introduce oxygen into the formation water and should not allow the formation water to come into contact with metals that may react with elements within the water. Furthermore to maximize the boiler operating temperature, using a very slight drop in formation fluid temperature near the boiler wall 210, also limits deposition and precipitation of minerals out of the formation fluids. The low differential temperature across boiler wall 210 requires a large wall surface area for a given power output.

The geothermal boiler shown in detail in FIG. 2 is the only component in contact with the geothermal heat source formation water and should be constructed of a durable, high-heat conduction material to ensure long life. The outer wall (210) may be made of various stainless steel alloys, brass, bronze or copper alloys, carbon or graphite composites, or perhaps a thin wall vessel of gold or titanium.

The bottomhole boiler 10 is positioned in the wellbore so that the external geologic water level is close to its top. This boiler operates with an internal pressure greatly below the pressure in the formation and so is designed to resist crushing external pressures while also offering high heat transfer capacity. To accomplish these goals, the outer wall (210) will use a ribbed or corrugated profile with internal strengthening structures as described below. The boiler can be a standardized length but most often will extend as far as possible down into the formation water to maximize heat removal.

Heat removal is limited by heat transfer area of the wall (210) as well as the nature of the formations that boiler 10 is submerged in. While water is envisioned to be present in the wellbore outside boiler 10, it is possible that in some dry granites, an introduced heat exchange fluid or compound may be used between the well bore walls and the wall (210). In a tertiary oil recovery application where oil or gas is co-produced in the same well-bore the formation fluid may be a hydrocarbon mixture.

In some monolithic igneous or metamorphic geologic structures, the boiler wall (210) may be the rock itself with a cemented airtight plug at the top isolating the rising steam from higher formations to prevent loss of heat. The main change in an open hole completion is that wall 210 becomes the rock face where the rock is both impervious enough to allow the boiler to maintain the necessary low boiling pressure and yet not release chemicals into the steam causing scaling and deposit in the system. The open hole boiler in impermentable rock allows a greater diameter chamber to be used than the rest of the well bore. This larger diameter gives more boiling surface area. Heat flow in igneous rock is by conduction and internal radioactive decay. Unlike other efforts which require artificial fractures to allow water to circulate through the granite formation, this process uses the formation's imperviousness to its advantage without the dangers of geologic induced earthquakes caused by other methods. The size of the boiling chamber is limited only by the formation integrity and system needs. The chamber size can be expanded over time using the geothermal power to power the mining process either directly or in adjacent vertical shafts. Only a fraction of the rock in the chamber needs to be removed, as mining rubble inside the boiling chamber 10 increases boiling and heat transfer area. Regardless of the size and shape of the boiling chamber it must remain isolated from formations above with an airtight seal as the geothermally produced steam enters the piping to the upper components and surface condenser 20.

The well-bore diameter limits the size of the steam passages from the bottom boiler up to the downward condensing water heater and to the surface. In order to maintain a large heat transfer surface 210 with the geothermal heat, the boiler supply water must form a thin film that flows from the top of the boiler to the bottom. Steam is produced off of this film. It is innovative processes occurring above the geothermal boiler 10 that result in the boiler feed water being substantially hotter than the boiler. It is this much hotter supply water that makes the process work efficiently. The boiler feed water uses its higher temperature to superheat the produced steam as the boiler feed water feeds down a boiler feed pipe/counter flow heat exchanger (205) located above and within boiler 10.

The hot feedwater, after traveling through 250 (the thrust support bearing with optional separately-powered motors), continues to the boiler water level control (220) located at the desired boiler water level near the bottom of the boiler. It should be remembered that in a very low pressure boiler, operating in many cases below atmospheric pressure, steam is produced only on the surface of water unless the water depth is so shallow that it does not significantly create a higher pressure on the floor of the boiler. The excess specific heat in the boiler feed water is used to superheat the produced steam along the entire length of the long vertical section of boiler 10, which may be over 300 meters long.

The still-pressurized boiler supply water then travels back upward in pipe 238, which can be either coaxially located with descending pipe 237, alongside the descending pipe 237, or wrapped around it in a upward helix (as shown) to impart more heat and some upward movement to the surrounding steam as it rotates As the formation temperature drops, the steam produced becomes less and less dense prior to compression. The rotation of the assembly of boiler feed water pipes, impellers, pumps and heat exchangers can provide initial compression and movement of the produced steam along the length of the vertical boiler 10. In some applications additional power may be needed to optimize steam production. This can be provided by a number of methods, but operating in a below atmospheric hot environment deep underground makes a separate water based hydraulic power loop an effective solution. Water supply pipe 260 and return pipe 270 to provide power to an extra water motor 250. At higher boiler operating pressures some or all of the internal rotational devices may not be needed. It is in below 100 C existing oilfield well-bores that require more equipment to maintain an even boiling pressure over a great vertical distance.

When the supply water returns to the top of boiler 10, its temperature is now near boiler temperature, but it is still highly pressurized. As it enters the rotating impeller (240), it travels outward inside the impeller blades, makes a 90 degree turn to the water pressure reducing jets, where it is sprayed on the vertical walls (210) of boiler 10. The forces from the water's change of inertia and the impulse force at the jets partially or fully power the rotation of the rotating impeller assembly (235). Thus, the entire impeller assembly (235) includes the water supply pipe (237) traveling inside or beside the water return pipe (238) with the water level control (220) located slightly below. An Archimedean screw-type pump (225) attached to the exterior of the water return pipe (238) serves to agitate and lift some of the water pooled in the boiler sump upwards to be sprayed on the underside surface of water directing conical boiling surface 222. Of course the details of creating the optimal steam generation environment will change depending on application needs.

Because the boiler operates at a low pressure, often below atmospheric, it can be made of a thin corrosion-resistant construction with corrugations to increase surface area and prevent collapse. The use of such surface area increasers as the water deflection cones (221 and 222) helps prevent collapse under negative pressure and provides additional heat transfer boiling surfaces.

At very low pressures, steam will only boil from the water surface due to the higher pressure created by any depth of water. This is of greater concern as the required saturation pressure drops to operate at lower-formation temperatures. Some of the rotational energy of the impeller assembly pressurizes the produced steam using one or more of the attached impellers, which revolve easily in the low pressure steam. The steam compression must be just enough to move the steam upward without raising the outer wall and other steam generating surfaces pressures. Additional water deflection cones such as 222 which would have a very slight taper above an impeller to direct the compressed steam away from the wall and serve to create a higher velocity profile in the center of the boiling chamber 10. The use of multiple impellers with water jets discharging on sections of the boiler maximizes steam production within a narrow long vertical boiler. It is to be able to utilize the countless abandoned oil and gas well-bores that make the boiler design so innovative.

Figure 3:
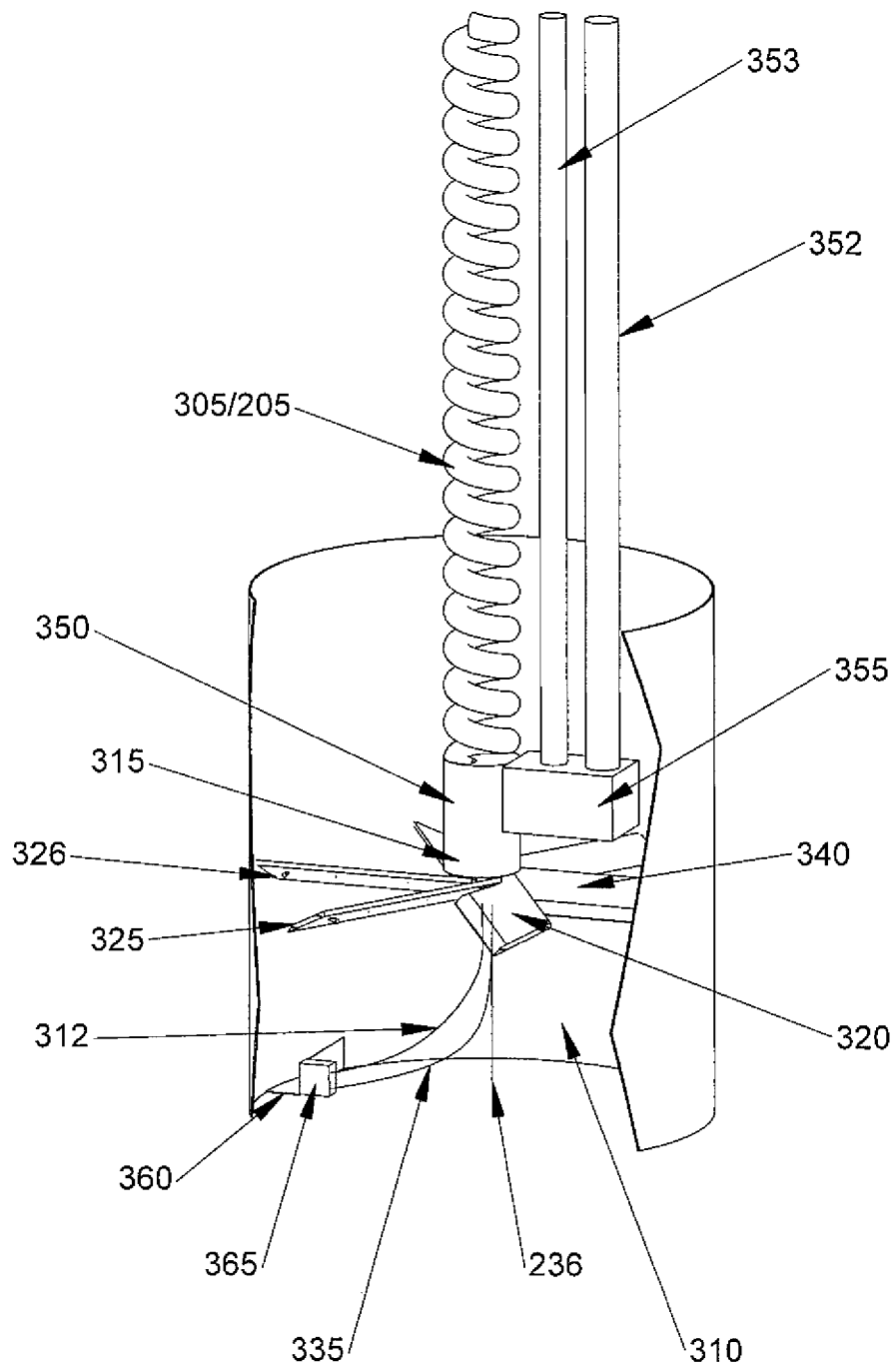

FIG. 3 shows a close-up view of the Water powered Impeller. Water flows downward from 45 through the heat exchanger supply pipe (305/205) to the rotary water supply union (350) with thrust bearing to support impeller 340. This allows 340 to rotate relative to 305, 312 and 335 pipes. Water travels downward inside the rotary union coaxially in that section, and water travels upward from the water control valve 365 through pipe 365. It is envisioned that one or more impellers with water jets will be used in a down-hole boiler 10 to maintain an even distribution of a thin film of water on the inside walls of 310 and to maintain a constant boiling pressure, even though the boiler may be over 1,000 feet high. A slightly inwardly tapered cone can extend from at the blade height upwards a desired distance to prevent a pressure building along the wall just above the impeller stage. The impeller itself can have a profile that accelerates the inner most area of steam more than the outer area of the impeller to further create a faster moving center section of steam. As steam output rises in a small pipe cross section further segregation steps may be need including a not shown inner steam discharge pipe that the impellers feed steam into.

Water catch tray 360, attached to wall 310, serves as part of the 365 control valve system. Control valve 365 may be a float valve, electric valve, or a piloted valve. Generally, as the desired boiler temperature drops and as boiler length grows, more impeller stages are needed to optimize the water flow to the available temperature and heat flow.

As the temperatures drops lower in the formation, it becomes more critical to operate the boiler with as small a heat drop as possible. Control valve 365 allows impeller 340 to spray just enough water to maintain a steady water level in 360 and not send too much water further down the boiler. In a multiple stage system, the next impeller down will be just below 360 until the bottom impeller stage is reached. The impeller blade will be shaped and rotated to produce just enough pressurization to overcome the effect of gravity as the steam travels upward. Thus, boiler 10 can maintain a tight pressure range over a great vertical distance so that water can be boiled all along its length.

The water flowing upward to impeller 340 from bottom control valve 365 through pipe 312 flows coaxially around pipe 335 as it nears the impeller from below. Once inside impeller 340 and rotary union 350, it stops and allows the water flow to enter water flow passage 315 in the hub of impeller 340.

The water leaves 315 and travels down a passage (320) inside the impeller vane (325). The water continues from passage 320 in a direction nearly perpendicular to passage 320 and discharges from an opening (326) on the back side of the vane (325). The water's change of momentum as it makes this sharp turn and its discharge from opening 326 creates forces to move the impeller in a rotary motion within the boiler. The water discharges from opening 326 such that its flow is nearly tangential to the boiler wall (310). When hitting the wall, it spreads out to provide a thin, even layer of water.

Ideally, water is boiled from the entire surface of the boiler wall to maximize heat transfer through wall 310. One of the advantages of using water-driven impellers at a higher temperature than the boiler walls is that the impeller blades serve as both heat exchangers and compression stages. Heating caused by impeller inefficiency merely provides additional superheat and is thus beneficial. Adding superheat to the wall produced steam helps move the steam upward out of the long boiler.

In some installations, a secondary water heat and power loop can be used to transfer additional superheating heat and/or power a water-driven motor (355) to provide additional rotational energy to one or more impeller stages. The water coming down pipe 365 from the surface powers the motor 355 and returns to surface in pipe 360.

Figure 4:
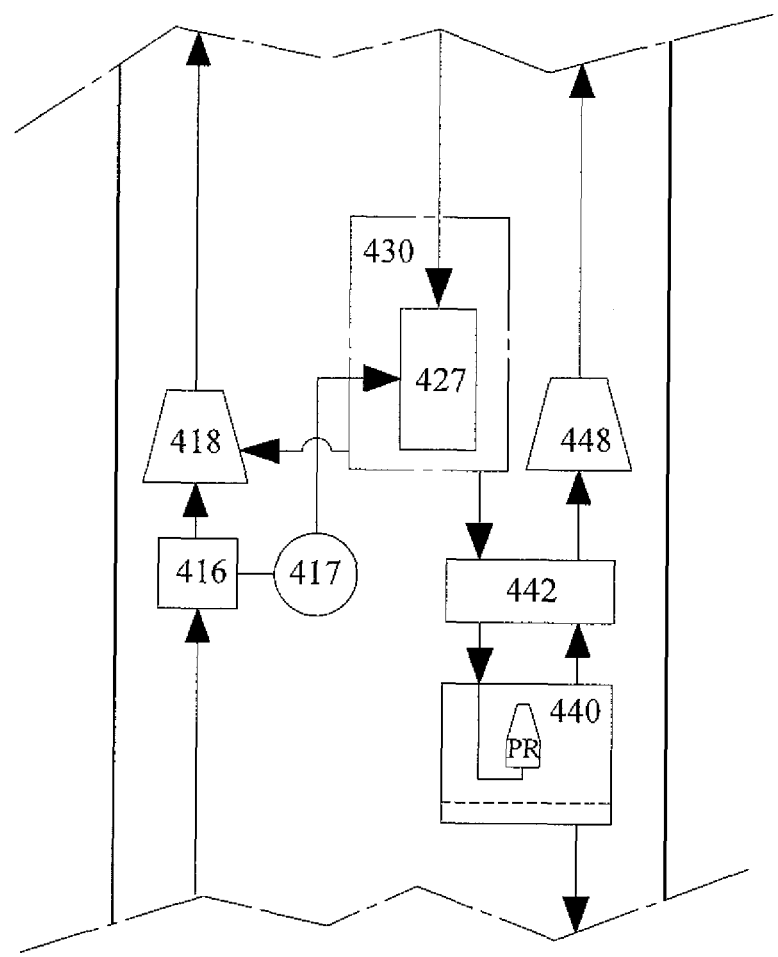

FIG. 4 is a flowchart showing the process flow in the present invention. The effect of device 30 is a key element of the invention. Using a long downward vertical path to pressurize a saturated water mixture offers a near isoentropic compression. Geothermally produced steam enters a jet condensing intensifier (430) from the steam flow divider (416). The steam is pulled into the inlet by inductive water jets (422) and/or water powered impellers (427). It is desired to have the water droplets remain suspended in the downward descending saturated water mixture and not attach to or remain on the walls of the insulated vessel.

A process of condensation similar to that in a rain cloud occurs as the pressure increases and the percentage of water increases incrementally. All of the heat of condensation is distributed throughout the mixture raising its temperature in a self-limiting equilibrium.

A hydrophilic coating can be applied to the walls of the vessel to further minimize water condensation on the insulated surface. Protrusions from the walls can redirect water back into the center of the falling mixture. The dynamics of small water droplets falling through a descending saturated steam mixture are complex, with water vapor condensing into the downward facing droplet surface and some of the water droplet evaporating on the lower pressure region on its upper surface. More of the mixture becomes saturated water as the pressure increases.

Depending on the vertical height, heat needs, and other factors, it may be desirable to separate some or all of the steam out of the mixture at a higher pressure than the inlet, rather than trying to condense all of the steam into a saturated liquid state. This separated steam can either be recombined with the rising geothermal steam in a steam jet compressor such as 418 or channeled to the surface in a separate pathway.

Removing some of the steam allows the pressurization process to occur in a less vertical distance to produce higher-pressure final steam. This process has many design variations without losing the core concept of gravitational pressurization to produce a higher saturation pressure steam than the geothermally boiled steam. The process exploits the specific gravity differences between the low pressure geothermal steam and the much higher density of the saturated mixture descending in the condensing intensifier (30).

However, saturated steam deep underground will condense as it rises up to the surface, so it must the superheated sufficiently to allow it to remain vapor all the way to the surface condenser (50). It is most effective to separate some of the steam from the descending mixture in one or more stages at a slightly reduced pressure from the descending saturated water mixture pressure. This pressure drop can be done by a nozzle which adds kinetic energy but cools the steam. This slightly reduced pressure allows the separated steam to be slightly superheated by the now hotter remaining saturated water mixture that continues downward with a more rapid pressure rise now, due to the higher density of the lower quality mixture.

Just below the bottom of the vessel 430, the total mixture makes a 180 degree turn and sprays through a final pressure-reducing nozzle in water heater boiler/steam separator 440 where some of the water evaporates at the reduced pressure, increasing the quality of the mixture. This steam travels upward thru heat exchanger 442, joining steam separated earlier in steam jet mixing compressor 448 while the remaining separated water travels downward to uses shown in FIG. 1 (FIG. 1, step 40).

The overriding design goal is to maximize thermodynamic and economic value by the near isoentropic compression process. At the last stage, the now compressed water gains pressure as it continues downward to provide energy to other steps and ultimately provide boiler feed water to boiler 10 as shown in FIG. 1.

A longer vertical height downward intensifier reduces the vertical height available to raise the water pressure again. Deeper wells allow more water hydraulic energy to be utilized, offsetting the pressure losses in the rising steam and pipe friction. The ratio of inlet steam to high pressure water spray determines the pressure rise per unit depth, the ultimate temperature and pressure, and length of vessel needed. A combination of impellers that are powered directly by water jets at their ends and secondary impellers that are propelled in the opposite direction by the water jetting out of a impeller just above may be used to increase initial compression and acceleration of the downward bound steam.

As shown in FIG. 5, the geothermal boiler can also be configured for high temperature deep wells. As an example, there are wellbores in South Texas that are 4,000 meters deep and have a bottom hole temperature of over 420K. With such a high initial boiling temperature, the downward jet condenser cannot develop enough pressure to generate 100% liquid with a significant temperature rise. But it can condense some of the steam and have a very high temperature saturated mixture exit at the bottom. Because this embodiment does not use the water-heated partial flow boiler and superheaters, it has a simpler flow chart.

Water is boiled at nearly 420K in the geothermal boiler (510). The steam is then compressed slightly by water-powered compressor 512 and rises through heat exchanger 560. It rises up to a flow divider (516) where some or even all of the steam from boiler 510 enters the downward travel condensation heated saturated mixture intensifier (530) through compressor 517 which can be a pump.

The remainder of the geothermally-produced steam in divider 516 rises to the surface to condenser 520 through a combiner 518 and compressor 519, which can be a pump. Combiner 518 accepts a diverted flow from insulated vessel 530. Pressurized return water from condenser 520 and condenser 550 combined adds density to the mixture and compression is achieved by jets or water-driven impellers (527) at the top of the insulated vessel (530) after proceeding through compressor 25. The flow entering 550 is divided with some flow being diverted to condenser 520 and the remainder being diverted to steam power loop 570 and 580 for reentry into condenser 520.

Some of the steam condenses as the mixture travels downward, raising the temperature up to the new saturation temperature. As the steam mixture pressure rises, it takes a larger pressure rise to raise the temperature. Thus, the process is limited to temperatures below the critical temperature.

Let us assume that a condensing steam pressure of 20 MPa at the surface condenser (550) is desired. The saturated mixture leaves the bottom of Intensifier 530 at 20 MPa and descends to a steam separator (540). The separated saturated liquid powers a water motor (542) that drives a compressor (545) to compress the separated steam fraction to 21 MPa. Preferably, the saturated water leaving 540 travels down through heat exchanger 560 before returning upward as 480K, 20 Mpa water to the motor (542). This provides energy to superheat the rising geothermal steam to nearly the exhaust temp of 530, which in this case is 630K. The exhaust water from motor 542 returns downward to the bottom of boiler 510, where a water level valve as shown in FIG. 2 (220) controls water flow to maintain the desired water level in boiler 510. The pressurized water travels back upward, heating the produced steam until it enters the water-powered compressor (512) where it sprays out onto the walls of the geothermal boiler (510).

The compressed superheated steam leaving compressor 545 travels upward to enter condenser 550. Steam at nearly 21 MPa and 640K is a high efficiency energy asset that has many uses. However, as it is near its saturation pressure, it cannot be used directly in a steam turbine as it will begin condensing within as it expands. The heat from 550 can be used to boil water at a lower pressure in a separate steam power loop (570 and 580) to provide a highly superheated steam suitable for a steam turbine-powered generator. When electricity generation is the primary goal, the waste heat from condenser 520 can be used to reheat the steam in a steam cycle to allow more steam expansion.

After full expansion of steam, the exhaust steam is condensed and joins with the water from condenser 520 to travel back down-hole. Because the down-hole jet condensation powered heater/compressor is able to process a larger fraction or all of the geothermal steam, this process offers real opportunity.

As a closed cycle, it avoids the problems existing with formation fluids being moved to the surface as has been attempted. Formation fluids unexposed to oxygen and reactive metals do not precipitate on the outside heat transfer surfaces of boiler 510, providing a long life even with concentrations of H2S and other toxic compounds in the formation water. Commonly used boiler water additives, water quality filters and degassing equipment can be added as needed to maintain system efficiency.

While the system is capable of running on a 24/7 base load basis, it is also possible to use it as a variable power output system by changing the boiling pressure in boiler 510. This is particularly easy in high temperature formations. Heat transfer from the formation to the water in the boiler is a function of the temperature difference. Using a larger temperature differential produces more steam at a lower temperature.

In practice a much cooler boiler temperature will cool the surrounding geothermal fluids in a short period of time, reducing the temperature differential. As peak electrical power has a much higher value than off peak power, this system can be used to provide this power at a higher than continuous rate for provision of peak power and allowed to operate at a much lower output when power is not needed.

The low duty periods allow the temperature of the geothermal fluid to rise due to conduction and convection in the formation and fluid. This temperature cycling allows more heat to be removed from the formation of a higher value than 24/7 steady state.

In order to lower the boiling temperature, the boiler pressure must be reduced (510). The condenser (520) pressure sets the boiler pressure, so by lowering the condenser saturation temperature, the geothermal boiler pressure is correspondingly reduced.

A surface externally-powered compressor (519) can serve to boost the condenser operating conditions and/or lower the boiler pressure additionally. The use of a variable speed motor to power compressor 519 allows the system output to be adjusted quickly to meet changing power demands. While it is desirable to have as much steam enter the downward steam intensifier (530), having separate piping to compressor 519 and condenser 520 is needed to start and regulate the process. It is the much lower pressure at the geothermal boiler, rather than the discharge pressure of the steam intensifier, that must exist for the process to work. If the system is stopped and the pressure allowed to equalize, it could not restart by itself due to excessive pressure in the geothermal boiler. Ideally, compressor 519 is used for startup and to regulate power output.

The use of mechanical power to operate the process degrades the overall efficiency of the process and so is intended to be minimized. The downward jet intensifier output is not affected much by a change in geothermal steam temperature as it uses the heat of condensation (not the steam's specific heat) as the heat source. The effect of gravity is constant; however, the return water density drops as its temperature increases, resulting in less pressure buildup as the water descends 1,000 meters (in this example) to the water-powered pressurizer (527) at the top of vessel 530.

The system's ability to meet peak short-term load demands greatly increases its commercial value both as a power grid generator and for off grid variable power loads. Peak power has a far higher value than off peak power at both retail and wholesale levels.

The invention claimed is:

1. A geothermal heat transfer system that heats water at a pressure reduced from hydrostatic pressure comprising:
   a reduced pressure water boiler located at a down-hole well-bore location, said boiler uses the specific heat of the entering water to produce steam;
   a water-powered steam compressor coupled to the reduced pressure water boiler, said compressor assisting in the production of steam;
   a first heat exchanger coupled to water-powered steam compressor and receiving system-heated steam from said compressor, said first heat exchanger heating the steam further;
   a jet compressor coupled said first heat exchanger to receive steam from the first heat exchanger and accelerate said steam in an up-hole direction toward the surface of the well-bore location;
   a flow divider coupled to the jet compressor, said flow divider receiving said steam from said jet compressor and dividing the flow of steam between a vertical vessel and a first surface condenser;
   said first surface condenser receiving said steam from said flow divider where the condensed water returns downward;
   an insulated vertical vessel that receives steam or water from said first surface condenser, said vertical vessel powers a compression device that acts on a portion of the previously-produced steam, propelling said steam downward as a combined saturated water mixture with the downward descent producing a rising saturation pressure and a decreasing steam quality until all of the steam entering the vessel has been condensed;
   a second heat exchanger coupled to the insulated vertical vessel, said second heat exchanger receives steam from the vertical vessel;
   a second boiler coupled to the second heat exchanger, said second boiler heats said steam received from the second heat exchanger;
   a second surface condenser coupled to said second boiler for receiving steam from second boiler to allow for heat discharge of said steam, said second surface condenser providing heat transfer capabilities on the surface and coupled to said first surface condenser;
   said second boiler coupled to said first heat exchanger so that heated water can be supplied to the reduced pressure water boiler through said water-powered steam compressor and said first heat exchanger.

2. The geothermal heat transfer system of claim 1 further comprising:
   a counter flow heat exchanger coupled to said second boiler to receive steam from said second boiler before providing steam to said reduced pressure water boiler.

3. The geothermal heat transfer system of claim 2 further comprising:
   a third boiler coupled to said counter flow heat exchanger to heat steam to provide to said jet compressor and to divert excess saturated water to the reduced water boiler.

4. The geothermal heat transfer system of claim 1 wherein said reduced pressure water boiler includes one or more impellor fan blades rotating around a first axis.

5. The geothermal heat transfer system of claim 1 wherein reduced pressure water boiler includes a feed tube for providing water to the boiler and a co-axial return pipe.

6. The geothermal heat transfer system of claim 1 wherein reduced pressure water boiler includes a screw-type pump.

7. The geothermal heat transfer system of claim 1 wherein reduced pressure water boiler includes one or more impellor vanes having an opening on the vane that allows for the discharge of water.

8. A geothermal heat transfer method that heats water at a pressure reduced from hydrostatic pressure comprising:
   heating water at a first boiler located at a down-hole well-bore location, said first boiler uses the specific heat of the entering water to produce steam;
   compressing steam received from the first water boiler at a steam compressor, said compressor assisting in the production of steam;
   receiving steam at a first heat exchanger from steam compressor, said first heat exchanger heating the steam;
   compressing steam received from first heat exchanger at a compressor and accelerating said steam in an up-hole direction toward the surface of the well-bore location;
   dividing the steam flow at a flow divider after receiving steam from the jet compressor, said flow divider said received steam into two paths;
   receiving steam at a first surface condenser from a first path from the flow divider and directing said steam as condensed water stream downward;
   receiving steam flow at a vertical vessel from said first surface condenser, said vertical vessel propelling said steam downward as a combined saturated water;
   receiving water mixture at a second heat exchanger from the insulated vertical vessel;
   receiving steam flow at a second boiler from the second heat exchanger, said second boiler heats said steam received from the second heat exchanger;
   transferring steam to a second surface condenser from said second boiler to allow for heat discharge of said steam, said second surface condenser providing heat transfer capabilities on the surface and said second surface condenser being coupled to said first surface condenser;
   transferring steam from a said second boiler to said first boiler so that heated water can be supplied to the boiler through said first heat exchanger.

9. The geothermal heat transfer method of claim 8 further comprising a second steam path where the steam travels upward in a separate path to a second surface condenser.

10. The geothermal heat transfer system of method of claim 8 further comprising:
    a counter flow heat exchanger coupled to said second boiler to receive steam from said second boiler before providing steam to said first water boiler.

11. The geothermal heat transfer method of claim 10 further comprising:
    a third boiler coupled to said counter flow heat exchanger to heat steam to provide to said jet compressor and to divert excess saturated water to the first boiler.

12. The geothermal heat transfer method of claim 8 wherein said first water boiler includes one or more impellor fan blades rotating around a first axis.

13. The geothermal heat transfer method of claim 8 wherein first water boiler includes a feed tube for providing water to the boiler and a co-axial return pipe.

14. The geothermal heat transfer method of claim 8 wherein first reduced pressure water boiler includes a screw-type pump.

15. The geothermal heat transfer method of claim 8 wherein first water boiler includes one or more impellor vanes having an opening on the vane that allows for the discharge of water.

16. A geothermal heat transfer system that heats water at a pressure reduced from hydrostatic pressure comprising:
- a first water boiler located at a down-hole, well-bore location,
- a first compressor coupled to the first boiler, said compressor assisting in the production of steam;
- a first heat exchanger coupled to said first compressor and receiving steam from said first compressor, said first heat exchanger heating the steam further;
- a second compressor coupled said first heat exchanger to receive steam from the first heat exchanger and accelerate said steam in an up-hole direction toward the surface of the well-bore location;
- a flow divider coupled to the second compressor, said flow divider receiving said steam from said second compressor and dividing the flow of steam;
- a first surface condenser receiving said steam from said flow divider where the condensed water returns downward;
- a vertical vessel that receives steam from said first surface condenser, said vertical vessel powers a compression device that acts on a portion of the previously-produced steam, propelling said steam downward;
- a second heat exchanger coupled to said vertical vessel, said second heat exchanger receives steam from the vertical vessel;
- a second boiler coupled to the second heat exchanger, said second boiler heats said steam received from the second heat exchanger; and,
- a second surface condenser coupled to said second boiler for receiving steam from second boiler to allow for heat discharge of said steam, said second surface condenser providing heat transfer capabilities on the surface and coupled to said first surface condenser;
- said second boiler coupled to said first heat exchanger so that water can be supplied to the first boiler.

17. The geothermal heat transfer system of claim 16 further comprising a second steam path where the steam travels upward in a separate path to a second surface condenser.

18. The geothermal heat transfer system of claim 16 further comprising:
- a counter flow heat exchanger coupled to said second boiler to receive steam from said second boiler before providing steam to said first water boiler.

19. The geothermal heat transfer system of claim 18 further comprising:
- a third boiler coupled to said counter flow heat exchanger to heat steam to provide to said jet compressor and to divert excess saturated water to the first boiler.

20. The geothermal heat transfer system of claim 16 wherein said first water boiler includes one or more impellor fan blades rotating around a first axis.

21. The geothermal heat transfer system of claim 16 wherein first water boiler includes a feed tube for providing water to the boiler and a co-axial return pipe.

22. The geothermal heat transfer system of claim 16 wherein first water boiler includes a screw-type pump.

23. The geothermal heat transfer system of claim 16 wherein reduced pressure first water boiler includes one or more impellor vanes having an opening on the vane that allows for the discharge of water.

* * * * *